United States Patent
Beckett et al.

(10) Patent No.: US 10,235,781 B2
(45) Date of Patent: Mar. 19, 2019

(54) VISUALIZATION OF PROVENANCE DATA

(71) Applicant: Oracle International Corporation, Redwood Shores, CA (US)

(72) Inventors: Kenneth H. Beckett, Foothill Ranch, CA (US); Sathyamoorthy Thelungupalayam Anandan, Placentia, CA (US); Reza B'far, Irvine, CA (US); Oshani W. Seneviratne, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 384 days.

(21) Appl. No.: 14/997,377

(22) Filed: Jan. 15, 2016

(65) Prior Publication Data
US 2017/0206683 A1    Jul. 20, 2017

(51) Int. Cl.
| | | |
|---|---|---|
| *G06F 3/048* | (2013.01) | |
| *G06T 11/20* | (2006.01) | |
| *G06F 3/0482* | (2013.01) | |
| *G06F 17/24* | (2006.01) | |
| *G06F 17/30* | (2006.01) | |
| *G06F 17/21* | (2006.01) | |

(52) U.S. Cl.
CPC .......... *G06T 11/206* (2013.01); *G06F 3/0482* (2013.01); *G06F 17/241* (2013.01); *G06F 17/30554* (2013.01); *G06F 17/211* (2013.01); *G06F 17/30572* (2013.01)

(58) Field of Classification Search
None
See application file for complete search history.

(56) References Cited

U.S. PATENT DOCUMENTS

| | | |
|---|---|---|
| 6,968,331 B2 | 11/2005 | Bar-Yossef et al. |
| 7,945,850 B2 | 5/2011 | Machalek |
| 8,046,273 B2 | 10/2011 | Welter |
| 8,527,879 B2 | 9/2013 | Symons et al. |
| 2001/0028364 A1 | 10/2001 | Fredell |
| 2002/0023122 A1 | 2/2002 | Polizzi |
| 2003/0140307 A1 | 7/2003 | Bar-Yossef et al. |
| 2004/0199543 A1 | 10/2004 | Braud et al. |
| 2004/0237038 A1 | 11/2004 | Stuhec |
| 2004/0252132 A1 | 12/2004 | Bhatt |
| 2005/0027574 A1 | 2/2005 | Agrawal et al. |

(Continued)

OTHER PUBLICATIONS

Ahmet Uyar et al., Evaluating search features of Google Knowledge Graph, Oct. 28, 2014, Emerald Group Publishing Limited, vol. 39 No. 2, pp. 197-213 (Year: 2014).*

(Continued)

*Primary Examiner* — Tam T Tran
(74) *Attorney, Agent, or Firm* — Invoke

(57) ABSTRACT

Visualization of provenance data is disclosed. An interface receives a request to display a set of entities that were derived from a user-selected entity and/or a set of entities that were used to derive the user-selected entity. An interface displays an interface element representing the user-selected entity. The interface also displays one or more interface elements representing the requested set(s) of entities. The interface concurrently displays a visualization, associated with the interface elements, that represents a relationship between the user-selected entity and the requested set(s) of entities.

16 Claims, 10 Drawing Sheets

(56) References Cited

U.S. PATENT DOCUMENTS

| | | |
|---|---|---|
| 2005/0177507 A1 | 8/2005 | Bandych et al. |
| 2006/0031849 A1 | 2/2006 | Barta et al. |
| 2006/0184882 A1 | 8/2006 | Molander et al. |
| 2006/0184883 A1 | 8/2006 | Jerrard-Dunne et al. |
| 2006/0195779 A1 | 8/2006 | McElroy et al. |
| 2006/0224951 A1 | 10/2006 | Burke et al. |
| 2006/0277089 A1 | 12/2006 | Hubbard et al. |
| 2007/0118446 A1 | 5/2007 | Soehngen |
| 2007/0162562 A1 | 7/2007 | Kwon et al. |
| 2007/0240063 A1 | 10/2007 | Cheng et al. |
| 2008/0040704 A1 | 2/2008 | Khodabandehloo et al. |
| 2008/0120129 A1 | 5/2008 | Seubert |
| 2008/0165133 A1 | 7/2008 | Blumenberg et al. |
| 2008/0229112 A1 | 9/2008 | Yamauchi et al. |
| 2008/0263216 A1 | 10/2008 | Jacob et al. |
| 2009/0063990 A1 | 3/2009 | Morris et al. |
| 2009/0070698 A1 | 3/2009 | Shurtleff |
| 2009/0158190 A1 | 6/2009 | Higginson |
| 2009/0222720 A1 | 9/2009 | Drieschner |
| 2009/0254825 A1 | 10/2009 | Sichart et al. |
| 2010/0058438 A1 | 3/2010 | Rajaram |
| 2010/0114629 A1* | 5/2010 | Adler .............. G06Q 10/00 705/7.36 |
| 2010/0138734 A1 | 6/2010 | Braud et al. |
| 2010/0332360 A1 | 12/2010 | Nowotny |
| 2012/0005659 A1 | 1/2012 | Bonanno |
| 2012/0323953 A1 | 12/2012 | Ortega et al. |
| 2013/0067115 A1 | 3/2013 | Lapanc |
| 2013/0117652 A1 | 5/2013 | Folsom |
| 2013/0145269 A1 | 6/2013 | Latulipe et al. |
| 2013/0282889 A1 | 10/2013 | Tito |
| 2013/0346900 A1* | 12/2013 | Matejka .......... G06F 17/30716 715/771 |
| 2014/0075380 A1 | 3/2014 | Milirud et al. |
| 2015/0089422 A1 | 3/2015 | Spaulding et al. |

OTHER PUBLICATIONS

Sue Feldman, Cognitive Computing—If I Only Had Another Brain, Jan. | Feb. 2016, Online Searcher, pp. 38-45 (Year: 2016).*

People Tools 8.51 PeopleBook: People Soft Query (Aug. 2010) pp. 1-188.

People Tools 8.51 PeopleBook: People Tools Portal Technologies (Aug. 2010) pp. 1-3.

People Tools 8.51 PeopleBook: People Tools Portal Technologies (Aug. 2010) pp. 1-34.

"Gource—A Software Version Control Visualization Tool", Online available at <http://gource.io/#>, retrieved on Jan. 25, 2016, 2 pages.

Borkin et al., "Evaluation of Filesystem Provenance Visualization Tools", IEEE Computer Society, Posted online on Oct. 13, 2013, 10 pages.

Github Inc., "Controls", available online at <https://github.com/acaudwell/Gource/wiki/Controls>, Mar. 25, 2015, retrieved on Jan. 25, 2016, 4 pages.

Gource, "Software Version Control Visualization—Google Project Hosting", available online at <https://code.google.com/p/gource>, retrieved on Jan. 25, 2016, 1 page.

Palantir Technologies, "Palantir Gotham: Integrate, Manage, Secure, and Analyze All of your Enterprise Data", available online at <https://www.palantir.com/palantir-gotham/applications/>, retrieved on Jan. 25, 2016, 4 pages.

Witt, Joe, "NiFiBetter Analytics Demand Better Dataflow", Apache NiFi, 2015, 18 pages.

Anchor Modeling; obtained at http://www.anchormodeling.com/?page.sub.--id=186; Sep. 20, 2013; 20 pages.

* cited by examiner

VISUALIZATION OF PROVENANCE DATA

RELATED APPLICATION; INCORPORATION BY REFERENCE

This application is related to U.S. patent application Ser. No. 14/033,327, filed Sep. 20, 2013, which is hereby incorporated by reference.

TECHNICAL FIELD

The present disclosure relates to provenance data. In particular, the present disclosure relates to visualization of provenance data.

BACKGROUND

Computer systems create, store, modify, and/or delete various data sets referred to herein as "entities." Different versions of a same data set may be referred to herein as different entities. An entity may refer to, for example, a digital file, a data object, a data structure, or a data set. A particular entity may be generated based on another entity. Additionally or alternatively, a first version of a particular entity may be generated based on a second version of the particular entity.

Provenance data includes information on the historical derivation of one or more entities in a computer system or application. Provenance data indicates which entities were derived from a particular entity, which activities were performed on and/or generated a particular entity, and which agents performed the activities on a particular entity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
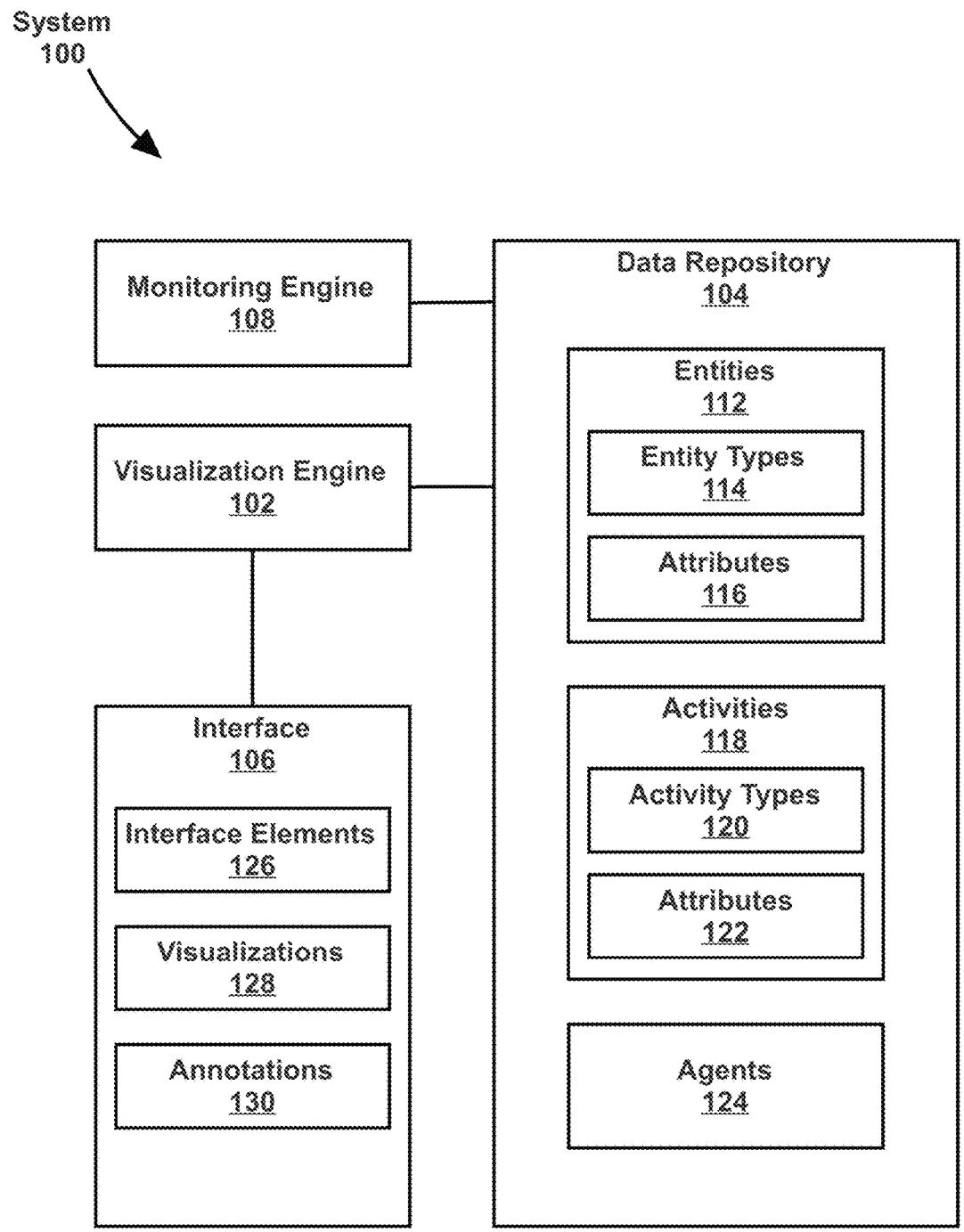
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. VISUALIZATION SYSTEM ARCHITECTURE
3. DISPLAYING A VISUALIZATION IDENTIFYING ENTITIES THAT WERE DERIVED FROM A PARTICULAR ENTITY AND/OR ENTITIES THAT WERE USED TO DERIVE THE PARTICULAR ENTITY
4. DISPLAYING A VISUALIZATION REPRESENTING ACTIVITIES BASED ON A CHRONOLOGICAL ORDER IN WHICH THE ACTIVITIES WERE PERFORMED
5. DISPLAYING A VISUALIZATION REPRESENTING A NUMBER OF ACTIVITIES PERFORMED, BY PARTICULAR AGENTS, ON ENTITIES OF A PARTICULAR ENTITY TYPE
6. MISCELLANEOUS; EXTENSIONS
7. HARDWARE OVERVIEW

1. General Overview

One or more embodiments include generating a visualization of provenance data related to a user-selected entity. An interface receives a request from a user. The request identifies a user-selected entity. Furthermore, the request calls for display of one or both of: (a) the entities that were used to derive the user-selected entity and (b) the entities that were derived from the user-selected entity. Based on the user's request, a visualization corresponding to one or both of (a) and (b) is generated and displayed. The generation and display of visualizations, as referred to herein, may be performed during different time periods or by different computer systems.

One or more embodiments include generating a visualization of activities performed on entities based on a chronological order in which the activities were performed. Entities that were used to derive a particular entity are identified. Alternatively or additionally, entities that were derived from the particular entity are identified. Activities performed on each of the identified entities are also identified. The visualization illustrates the entities and the corresponding activities in chronological order. The activities may be, for example, placed on a timeline.

One or more embodiments include generating a visualization based on a number of activities that were performed, by particular agents, on entities of a particular entity type. The visualization illustrates a particular icon representing the particular entity type. The visualization further illustrates two or more lines stemming from the particular icon. Each line, stemming from the particular icon, connects to a different icon representing a different agent. The width of each line represents the number of activities performed, by the corresponding agent, on entities of the particular entity type. For example, a thicker line may represent a larger number of activities, while a narrower line may represent a smaller number of activities.

2. Visualization System Architecture

FIG. 1 illustrates a system 100 in accordance with one or more embodiments. As illustrated in FIG. 1, system 100 includes visualization engine 102, data repository 104, interface 106, and monitoring engine 108. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be implemented or may execute on the same computing system as visualization engine 102 and/or monitoring engine 108. Alternatively or additionally, data repository 104 may be implemented or executed on a separate computing system than visualization engine 102 and/or monitoring engine 108. Data repository 104 may be communicatively coupled to visualization engine 102 and/or monitoring engine 108 via a direct connection or via a network.

Information describing entities 112, activities 118, and agents 124 may be implemented across any of components within system 100. However, this information is illustrated within data repository 104 for purposes of clarity and explanation.

In an embodiment, an entity 112 is any data set created, stored, modified, and/or deleted by a computer system or application. Examples of an entity include, but are not limited to, a digital file, a data object, and a data structure. Different versions of a same data set may be generated and referred to herein as different entities. As an example, a first user may create document D. A second user may modify document D and save document D with the modifications. The version of document D that was created by the first user would be a first version of document D. The version of document D that was created by the second user would be a second version of document D. The first version of document D and the second version of document D would be different entities.

A particular relationship may exist between a first entity and a second entity. A first entity is referred to herein as having been "derived from" a second entity if the first entity's content, attributes, and/or characteristics are at least partly determined based on the second entity. Furthermore, the first entity is referred to herein as having been "derived from" the second entity if the first entity is created based on the existence of the second entity. Conversely, a first entity is referred to herein as having been "used to derive" a second entity if the second entity's content, attributes, and/or characteristics are at least partly determined based on the first entity. Furthermore, the first entity is referred to herein as having been "used to derive" the second entity if the second entity is created based on the existence of the first entity.

As an example, a user may create a data structure EE for an employee profile. Data structure EE may include the fields, "Name," and "Position." Subsequently, the user may use data structure EE to generate a new data structure PT for a part-time employee profile. The user may copy data structure EE and add an additional field, "Employed Hours." Data structure PT may include the fields, "Name," "Position," and "Employed Hours." In this example, data structure PT was derived from data structure EE. Meanwhile, data structure EE was used to derive data structure PT.

The term "derived from" may be used herein to refer to both direct and indirect derivation. Similarly, the term "used to derive" may be used herein to refer to both direct and indirect derivation. A first entity is "directly derived from" a second entity if a single activity, performed on the second entity, generates the first entity. A first entity is "indirectly derived from" a second entity if at least one intermediate entity exists in the derivation history between the second entity and the first entity.

As an example, a user may create a data set DS that includes information on annual crime rates over ten years. The user may use data set DS to create a graphical chart GC representing the annual crime rates over time years. The user may copy graphical chart GC into a journal article JA on crime rates. In this example, graphical chart GC would be "directly derived from" data set DS. Journal article JA would be "indirectly derived from" data set DS.

An entity 112 may be associated with one or more entity types 114. An entity type 114 is a particular classification of entities 112 made based on the content, attributes, and/or characteristics of the entities 112. As an example, documents in an electronic file system may be classified based on content. Documents including content on dogs would correspond to a first entity type, while documents including content on cats would correspond to a second entity type.

As another example, data objects in an application may be classified based on the information represented by the data objects. Data objects representing health insurance would correspond to a first entity type, while data objects representing dental insurance would correspond to a second entity type.

An entity 112 may be associated with one or more attributes 116. An attribute 116 is a particular feature of an entity 112 that is commonly shared amongst multiple entities 112. A particular attribute 116 shared amongst different entities 112 may assume different values. As an example, various documents may exist in an electronic file system. A "Title" may be an attribute of the documents. A value for the attribute "Title" of a first document may be "Apples Are Good." A value for the attribute "Title" of a second document may be "Cars Are Fast."

In one or more embodiments, an activity 118 is any action or dynamic process that is performed on an entity 112 and/or that generates another entity 112. Examples of activities 118 include updating an entity, modifying an entity, copying an entity, duplicating an entity, storing an entity in a different location, quoting an entity, deleting an entity, and invalidating an entity. An activity 118 is referred to herein as being "performed on a particular entity" if the particular entity was already in existence before the activity begun. An activity 118 is referred to herein as "generating a particular entity" if the particular entity was not in existence before the activity commenced.

An activity 118 may be performed on a first entity to generate a second entity. As an example, a user may include a quote from a document D1 in a new document D2. The quotation activity would be "performed on" document D1 to "generate" document D2.

An activity 118 may be performed on a first entity, without generating a second entity. As an example, a document D may be deleted from an application. The deletion activity would be "performed on" document D, without generating any other entity. Alternatively, an activity 118 generates a first entity, without having been performed on a second entity. As an example, a user may create a new document D for a new novel that she is writing. The creation activity would be "generating" document D, without having been performed on another entity.

An activity 118 may be associated with one or more activity types 120. An activity type 120 is a particular classification of activities 118 made based on the attributes, and/or characteristics of the activities 118. As an example, activities performed on a set of entities may be classified based on resulting states of the set of entities. Activities that cause an entity to be modified would correspond to a first activity type. Activities that cause an entity to be deleted would correspond to a second activity type. Activities that cause an entity to be created would correspond to a third activity type.

An activity 118 may be associated with one or more attributes 122. An attribute 122 is a particular feature of an activity 118 that is commonly shared amongst multiple activities 118. A particular attribute 122 of different activities 118 may assume different values. As an example, various activities may be performed on a set of entities in an application. A "Start Time" may be an attribute of the activities. A value for the attribute "Start Time" of a first activity may be "12:11 a.m." A value for the attribute "Start Time" of a second activity may be "1:09 p.m."

In one or more embodiments, an agent 124 is any person, application, organization, or physical object that performs an activity 118. An agent 124 is referred to herein as "performing a particular activity" if the agent 124 has some degree of responsibility for the particular activity taking place. An agent 124 performs an activity 118 if the agent 124, for example, takes one or more actions of the activity 118, executes one or more operations of the activity 118, and/or triggers or causes the activity 118. Multiple agents 124 may perform a single activity 118. Each agent 124 performing a single activity 118 may have different roles.

As an example, a user may click a button of an application to initiate a particular computation on a data set. Responsive to the button click, the application may execute the particular computation. Both the user and the application would be "Agents" that perform the computation activity. The user's role may be "Initiator," while the application's role may be "Executor."

In one or more embodiments, interface 106 refers to hardware and/or software configured to facilitate communications between a user and visualization engine 102. Interface 106 renders interface elements 126, visualizations 128, and annotations 130 and receives user input. Examples of interfaces 106 include a graphical user interface (GUI), a command line interface (CLI), a haptic interface, and a voice command interface.

Different components of interface 106 may be specified in different languages. The behavior of interface elements 126, visualizations 128, and annotations 130 is specified in a dynamic programming language, such as JavaScript. The content of interface elements 126, visualizations 128, and annotations 130 is specified in a markup language, such as hypertext markup language (HTML) or XML User Interface Language (XUL). The layout of interface elements 126, visualizations 128, and annotations 130 is specified in a style sheet language, such as Cascading Style Sheets (CSS). Alternatively, interface 106 is specified in one or more other languages, such as JavaScript, Java, C, or C++.

In one or more embodiments, an interface element 126 is an element that is rendered at interface 106 to represent certain information to a user. Types of interface elements 126 include but are not limited to input controls, navigational components, informational components, and containers. Specific examples of interface elements include icons, message boxes, modal windows, pop-up windows, notifications, checkboxes, radio buttons, dropdown lists, list boxes, buttons, toggles, text fields, date and time selectors, command lines, sliders, pages, and forms.

In one or more embodiments, a visualization 128 is a feature and/or detail added to one or more interface elements 126 to represent additional information that is related to the information represented by the interface elements 126. Examples of visualizations 128 include a line, an arrow, a shape, a color, an animation, and a pattern. As an example, entities may be represented by circular icons rendered at an interface. A visualization corresponding to the circular icons may be a color of the circular icons. The color of a circular icon may indicate a particular entity type associated with an entity represented by the circular icon. An entity of a first entity type may be represented by a red circular icon, while an entity of a second entity type may be represented by a blue circular icon.

In one or more embodiments, an annotation 130 is a label, tag, and/or comment added to one or more interface elements 126 and/or visualizations 128 to represent additional information that is related to the information represented by the interface elements 126. An annotation 130 may be graphical and/or textual. As an example, entity Y may be derived from entity X. A first icon representing entity X and a second icon representing entity Y may be rendered at an interface. An arrow stemming from the second icon to the first icon may be a visualization representing the relationship between entity X and entity Y, from the perspective of entity X. The arrow may be annotated with the text "Was Derived From." The annotation may be read according to the direction in which the arrow points. Since the arrow points from the second icon (representing entity Y) to the first icon (representing entity X), the annotation would be read as "entity Y was derived from entity X."

In one or more embodiments, monitoring engine 108 refers to hardware and/or software configured to monitor information regarding the entities 112, activities 118, and/or agents 124 of a target computer system or application, and populates data repository 104 accordingly.

In an embodiment, monitoring engine 108 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, a personal digital assistant ("PDA").

In one or more embodiments, visualization engine 102 refers to hardware and/or software configured to perform operations described herein for displaying visualizations of provenance data. Examples of operations for displaying visualizations of provenance data are described below with reference to FIGS. 2, 4, and 6.

Visualization engine 102 may be implemented on one or more digital devices. Visualization engine 102 may be implemented as a standalone application that is independent of the target computer system or application monitored by monitoring engine 108. Alternatively, visualization engine 102 may be implemented as a plug-in application or a function integrated with the target computer system or application monitored by monitoring engine 108.

Figure 2:
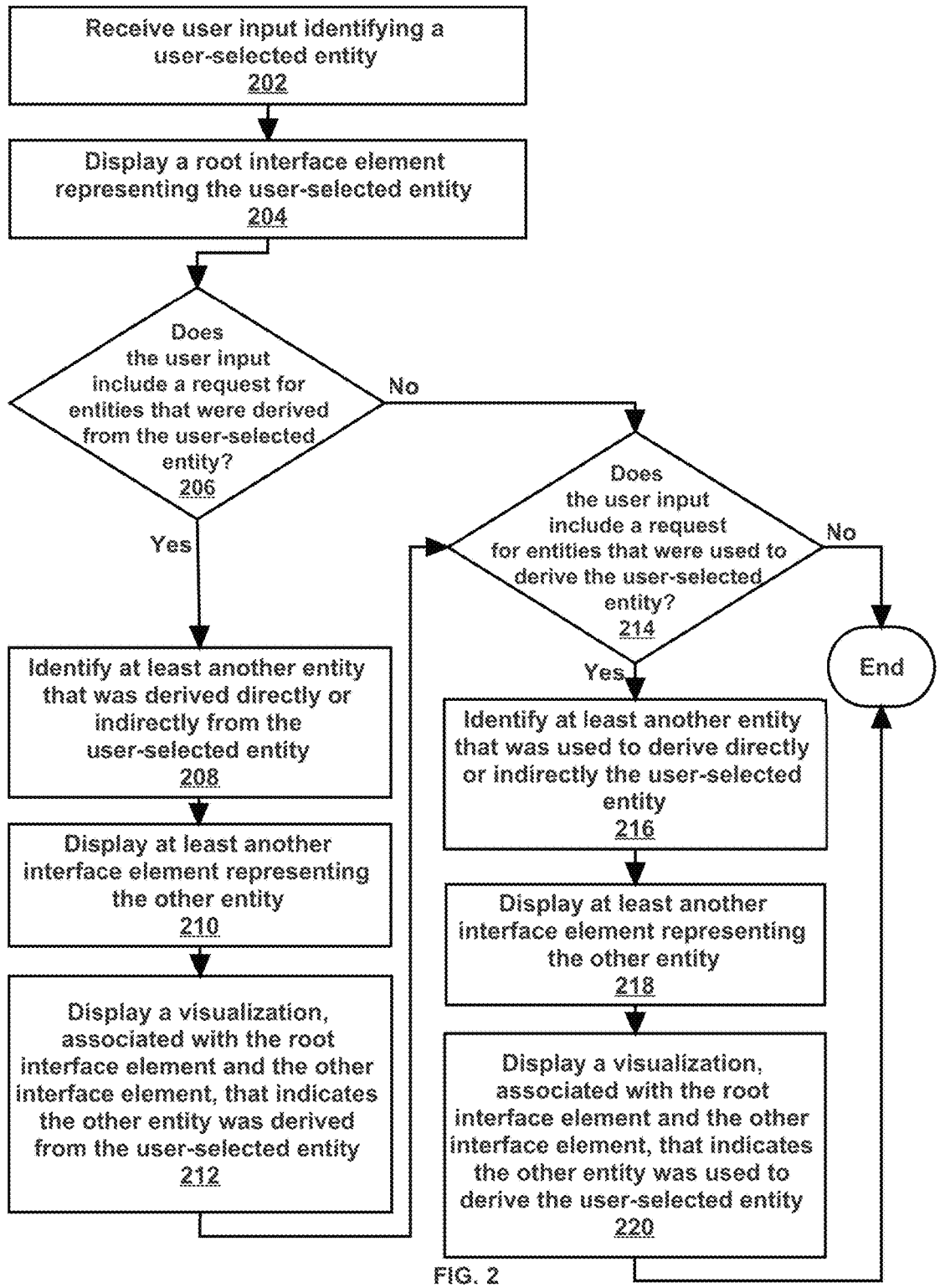
FIG. 2 illustrates an example set of operations for displaying a visualization identifying entities that were derived from a particular entity and/or entities that were used to derive the particular entity, in accordance with one or more embodiments.

3. Displaying a Visualization Identifying Entities that were Derived from a Particular Entity and/or Entities that were Used to Derive the Particular Entity FIG. 2 illustrates an example set of operations for displaying a visualization identifying entities that were derived from a particular entity and/or entities that were used to derive the particular entity, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include receiving user input identifying a user-selected entity (Operation 202). User input, entered by a user through an interface, identifies the user-selected entity as a particular entity for which provenance data is to be displayed.

User input received in a blank field (such as a textbox), presented at an interface, may include an identification of the user-selected entity. The user input may include a unique identifier corresponding to the user-selected entity. Alternatively, the user input may include a memory location of a particular data set corresponding to the user-selected entity. The user input may also identify a version of the particular data set corresponding to the user-selected entity.

User input may include a selection of the user-selected entity from a list of entities presented at an interface. The list of entities is determined based on monitoring of entities, activities, and/or agents of a target computer system or application. A log of the entities, activities, and/or agents of a target computer system or application may be maintained by the target computer system or application itself or by an external application. Alternatively or additionally, information about the entities, activities, and/or agents of a target computer system or application may be obtained as the activities are being performed in the target computer system or application.

One or more embodiments include displaying a root interface element representing the user-selected entity (Operation 204). An interface displays the root interface element.

The root interface element may be displayed with one or more visualizations and/or annotations. As an example, a particular entity may correspond to a data set having a name "Hello." An interface element representing the particular entity may be displayed with an annotation indicating the name "Hello." As another example, a particular may entity may be associated with a particular entity type. An interface element representing the particular entity may be displayed in the color blue to indicate the particular entity type.

One or more embodiments include determining whether the user input includes a request for entities that were derived from the user-selected entity (Operation 206). An interface presents an option for requesting entities that were derived from the user-selected entity and an option for requesting entities that were used to derive the user-selected entity. A user may select, through the interface, one or both options.

One or more embodiments include identifying at least another entity that was derived, directly or indirectly, from the user-selected entity if the user input includes a request for identifying entities derived from the user-selected entity (Operation 208).

A monitoring engine monitors activities performed in a target computer system or application to generate monitoring data. Entities associated with the activities and agents performing the activities are also monitored. The monitoring data indicates, for example, how each entity was derived, why each entity was derived, how the content of an entity was determined, why or how an entity was modified, and why or how an entity was deleted.

The monitoring data may be stored in a log, database, table, and/or other data storage. Each entry in the data storage may correspond to an activity. Each entry includes multiple fields for storing different information related to the activity, such as an entity upon which the corresponding activity was performed, an entity that was generated by the corresponding activity, and an agent that performed the corresponding activity. Additionally or alternatively, the monitoring data associated with an entity may be stored with the entity as metadata. The metadata may be stored by an agent that performs an activity, or by an application or system.

A visualization engine identifies a first set of one or more entities that were derived directly from the user-selected entity based on the monitoring data. The visualization engine may also identify a second set of one or more entities that were derived directly from the first set of entities. The process may be repeated until all entities derived directly or indirectly from the user-selected entity are determined.

As an example, a target application may maintain a log on the activities that were performed in the target application. The log may indicate that a "Modifying" activity was performed on a user-selected entity to generate a first entity. The log may also indicate that a "Copying" activity was performed on the first entity to generate a second entity. Based on the log, relationships between the user-selected entity, the first entity, and the second entity may be determined. The relationships would indicate that the second entity was derived directly from the first entity and was derived indirectly from the user-selected entity.

One or more embodiments include displaying at least another interface element representing the entity that was derived from the user-selected entity (Operation 210). The interface displays the other interface element concurrently with the root interface element. The other interface element may be displayed with one or more visualizations and/or annotations.

One or more embodiments include displaying a visualization, associated with the root interface element and the other interface element. The visualization indicates that the other entity was derived from the user-selected entity (Operation 212). The interface displays the visualization concurrently with the root interface element and the other interface element. The visualization may be displayed with one or more annotations. The visualization presents the provenance data of the user-selected entity, from the perspective of the user-selected entity.

As an example, a user may request entities that were derived from entity X. Entity Y may be derived from entity X. A first icon representing entity X and a second icon representing entity Y may be rendered at an interface. An arrow stemming from the second icon to the first icon may be a visualization representing a relationship between entity X and entity Y, from the perspective of entity X. The arrow may be labeled with the text "Was Derived From" to indicate that entity Y was derived from entity X.

In one or more embodiments, if the user input does not include a request for entities derived from the user-selected entity, then at least Operations 210-212 are not performed. The other interface element representing an entity derived from the user-selected entity is not displayed. The visualization associated with the root interface element and the other interface element is not displayed.

One or more embodiments include determining whether the user input includes a request for entities that were used to derive the user-selected entity (Operation 214). An interface presents an option for requesting entities that were derived from the user-selected entity and an option for requesting entities that were used to derive the user-selected entity. A user may select, through the interface, one or both options.

One or more embodiments include identifying at least another entity that was used, directly or indirectly, to derive the user-selected entity if the user input includes a request for entities that were used to derive the user-selected entity (Operation 216). Entities that were used, directly or indirectly, to derive the user-selected entity may be identified based on monitoring data. Generating, storing, and using monitoring data is described above with reference to Operation 208.

One or more embodiments include displaying at least another interface element representing the entity that was used to derive the user-selected entity (Operation 218). The interface displays the other interface element concurrently with the root interface element. The other interface element may be displayed with one or more visualizations and/or annotations.

One or more embodiments include displaying a visualization, associated with the root interface element and the other interface element. The visualization indicates that the other entity was used to derive the user-selected entity (Operation 220). The interface displays the visualization concurrently with the root interface element and the other interface element. The visualization may be displayed with one or more annotations. The visualization presents the provenance data of the user-selected entity, from the perspective of the user-selected entity.

As an example, a user may request entities that were used to derive entity X. Entity W may be used to derive entity X. A first icon representing entity X and a second icon representing entity W may be rendered at an interface. An arrow stemming from the second icon to the first icon may be a visualization representing a relationship between entity X and entity W, from the perspective of entity X. The arrow may be labeled with the text "Was Used to Derive" to indicate that the entity W was used to derive entity X.

In one or more embodiments, if the user input does not include a request for entities that were used to derive the user-selected entity, then at least Operations 218-220 are not performed. The other interface element representing an entity that was used to derive the user-selected entity is not displayed. The visualization associated with the root interface element and the other interface element is not displayed.

EXAMPLE EMBODIMENTS

Figure 3A:
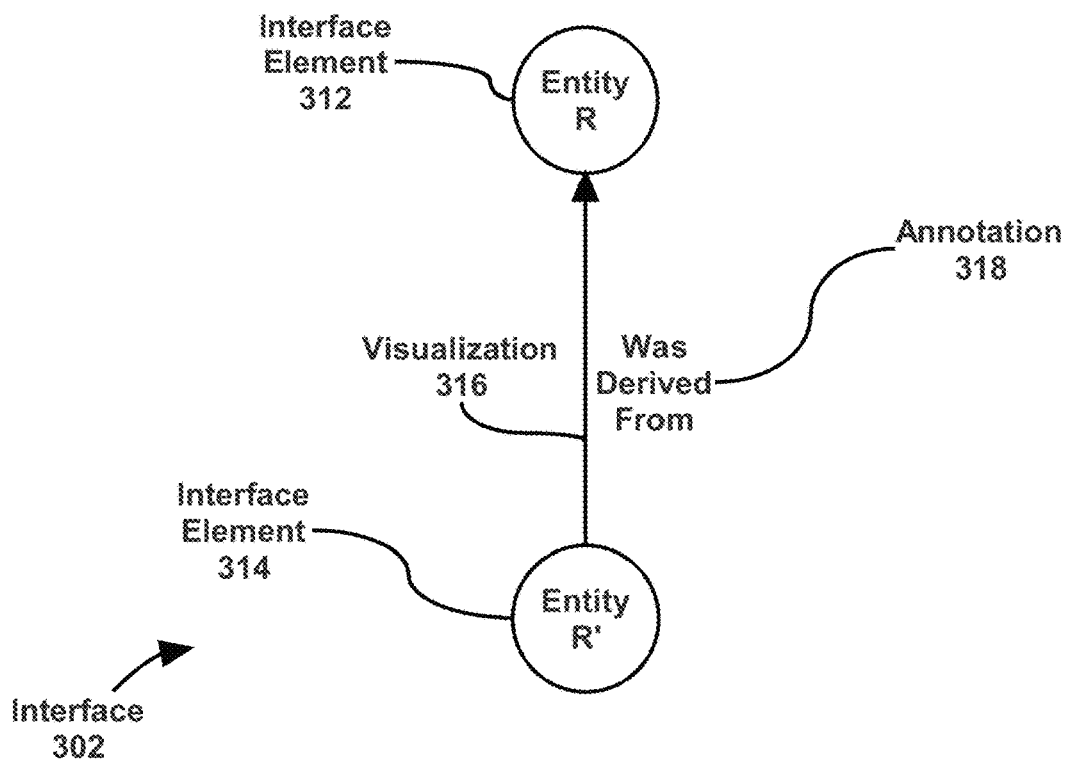
FIGS. 3A-3C illustrate examples of interfaces displaying visualizations identifying entities that were derived from a particular entity and/or entities that were used to derive the particular entity, in accordance with one or more embodiments.
Figure 3B:
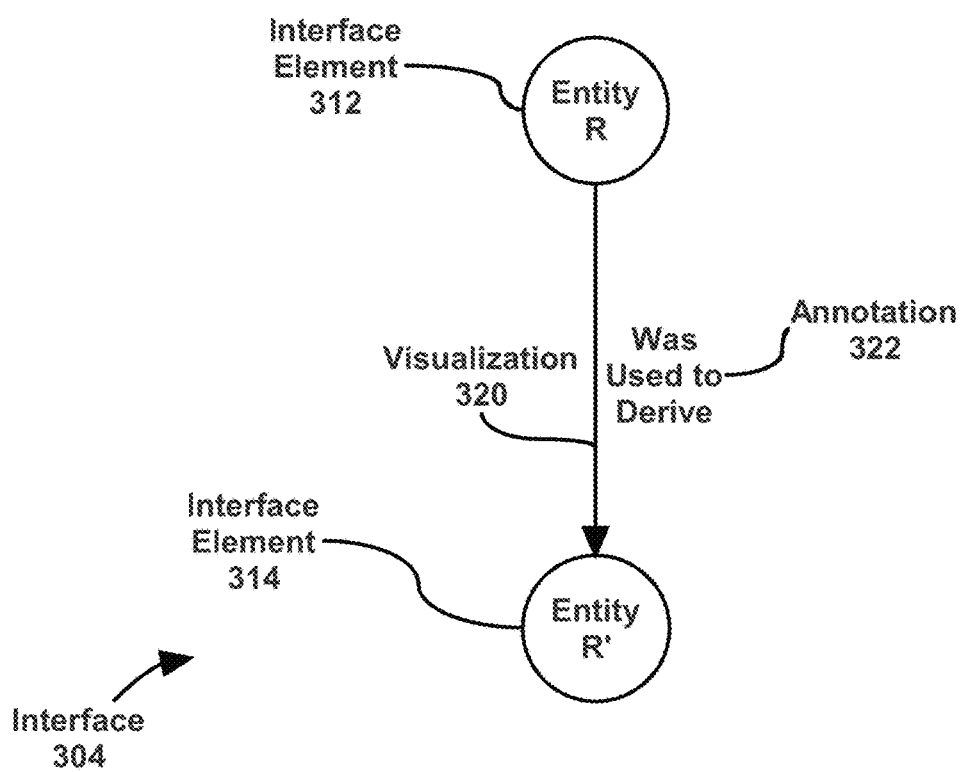
Figure 3C:
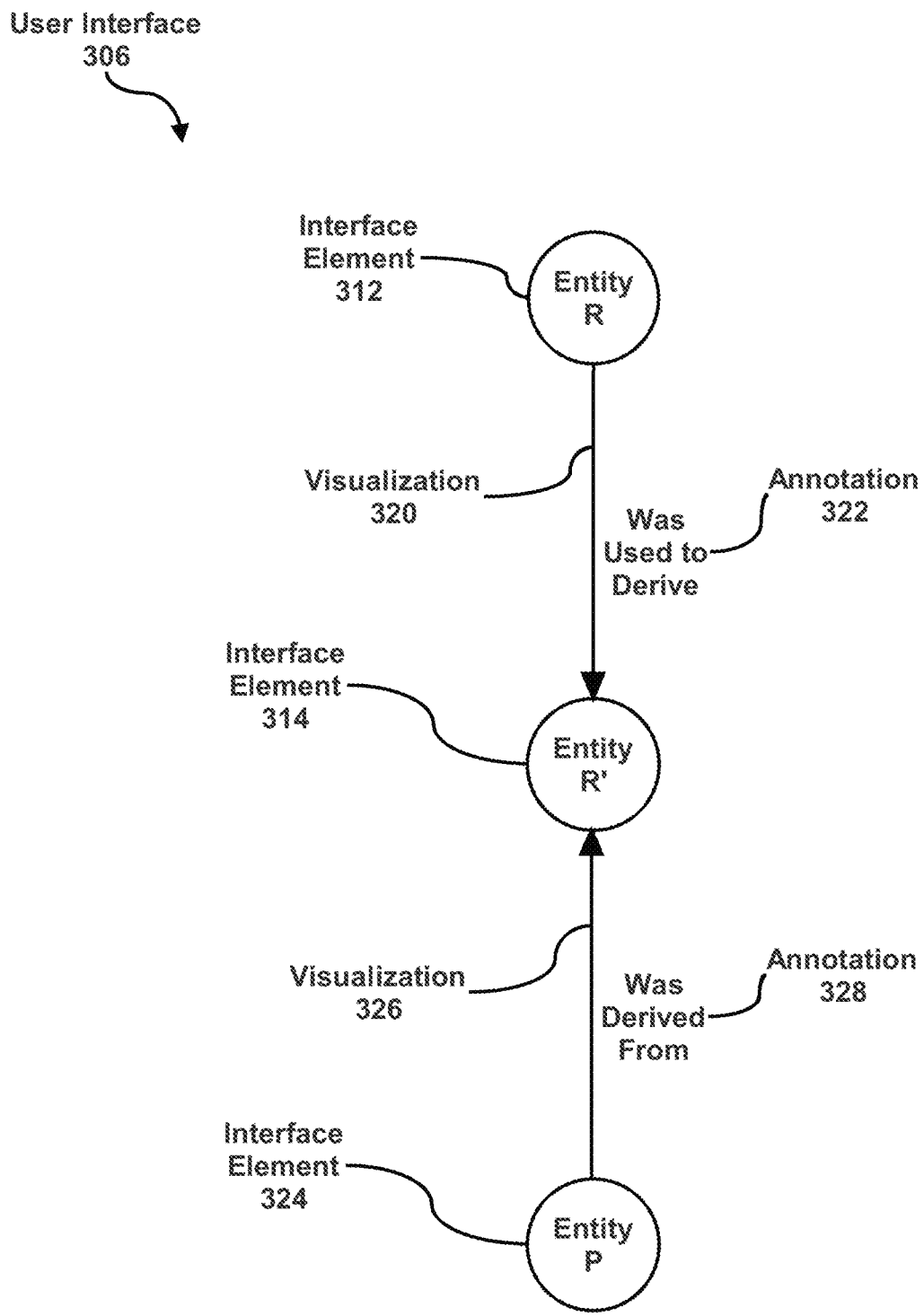

Detailed examples are described below for purposes of clarity. Components and/or operations described below should be understood as specific examples which may not be applicable to certain embodiments. Accordingly, components and/or operations described below should not be construed as limiting the scope of any of the claims. FIGS. 3A-3C illustrate examples of interfaces displaying visualizations identifying entities that were derived from a particular entity and/or entities that were used to derive the particular entity, in accordance with one or more embodiments.

As an example, an application includes a data structure EE for an employee profile. A first version of data structure EE is created. The first version of data structure EE is Entity R. Entity R includes a field, "Name." Data structure EE is modified to generate a second version of data structure EE. The second version of data structure EE is Entity R'. Entity R' replaces the field "Name" with two fields, "First Name" and "Last Name." The second version of data structure EE is duplicated and modified to generate another data structure PS for a part-time employee profile. Data structure PS is Entity P. Entity P includes an additional field, "Hours Employed." The application monitors the activities in the application and generates a log of the activities. The log includes a first entry for generation of Entity R, a second entry for generation of Entity R', and a third entry for generation of Entity P.

In a first scenario, user input, received through an interface, includes a request for entities that were derived from Entity R. Based on the log maintained by the application, relationships between entities in the application are determined. Based on the relationship between Entity R and Entity R', Entity R' is determined to be derived from Entity R.

As illustrated in FIG. 3A, interface 302 is rendered. Interface 302 displays interface element 312, interface element 314, visualization 316, and annotation 318. Interface element 312 represents Entity R. Interface element 314 represents Entity R'. Visualization 316 is associated with interface elements 312-314 and represents a relationship between Entity R and Entity R'. Visualization 316 is an arrow pointing from interface element 314 to interface element 312 to represent the relationship from the perspective of Entity R. Annotation 318 is associated with visualization 316 and labels the arrow as "Was Derived From." Annotation 318 is read according to the direction in which the arrow points. Since the arrow points from interface element 314 (representing Entity R') to interface element 312 (representing Entity R), annotation 318 is read as "Entity R' was derived from Entity R."

In a second scenario, user input, received through an interface, includes a request for entities that were used to derive Entity R'. Based on the log maintained by the application, relationships between entities in the application are determined. Based on the relationship between Entity R and Entity R', Entity R is determined to have been used to derive Entity R'.

As illustrated in FIG. 3B, interface 304 is rendered. Interface 304 displays interface element 312, interface element 314, visualization 320, and annotation 322. Interface element 312 represents Entity R. Interface element 314 represents Entity R'. Visualization 320 is associated with interface elements 312-314 and represents a relationship between Entity R and Entity R'. Visualization 320 is an arrow pointing from interface element 312 to interface element 314 to indicate that the relationship is presented from the perspective of Entity R'. Annotation 322 is associated with visualization 320 and labels the arrow as "Was Used to Derive." Annotation 322 is read according to the direction in which the arrow points. Since the arrow points from interface element 312 (representing Entity R) to interface element 314 (representing Entity R'), annotation 322 is read as "Entity R was used to derive Entity R'."

In a third scenario, user input, received through an interface, includes a request for both (a) entities that were derived from Entity R' and (b) entities that were used to derive Entity R'. Based on the log maintained by the application, relationships between entities in the application are determined. Based on the relationship between Entity R and Entity R', Entity R is determined to have been used to derive Entity R'. Based on the relationship between Entity R' and Entity P, Entity P is determined to be derived from Entity R'.

As illustrated in FIG. 3C, interface 306 is rendered. Interface 306 displays interface element 312, interface element 314, interface element 324, visualization 320, annotation 322, visualization 326, and annotation 328. Interface element 312 represents Entity R. Interface element 314 represents Entity R'. Interface element 324 represents Entity P.

Visualization 320 is associated with interface elements 312-314 and represents a relationship between Entity R and Entity R'. Visualization 320 is an arrow pointing from interface element 312 to interface element 314 to indicate that the relationship is presented from the perspective of Entity R'. Annotation 322 is associated with visualization 320 and labels the arrow as "Was Used to Derive." Annotation 322 is read according to the direction in which the arrow points. Since the arrow points from interface element 312 (representing Entity R) to interface element 314 (representing Entity R'), annotation 322 is read as "Entity R was used to derive Entity R'."

Visualization 326 is associated with interface element 314 and interface element 324. Visualization 326 represents a relationship between Entity R' and Entity P. Visualization 326 is an arrow pointing from interface element 324 to interface element 314 to indicate that the relationship is presented from the perspective of Entity R'. Annotation 328 is associated with visualization 326 and labels the arrow as "Was Derived From." Annotation 328 is read according to the direction in which the arrow points. Since the arrow points from interface element 324 (representing Entity P) to interface element 314 (representing Entity R'), annotation 328 is read as "Entity P was derived from Entity R'."

Figure 4:
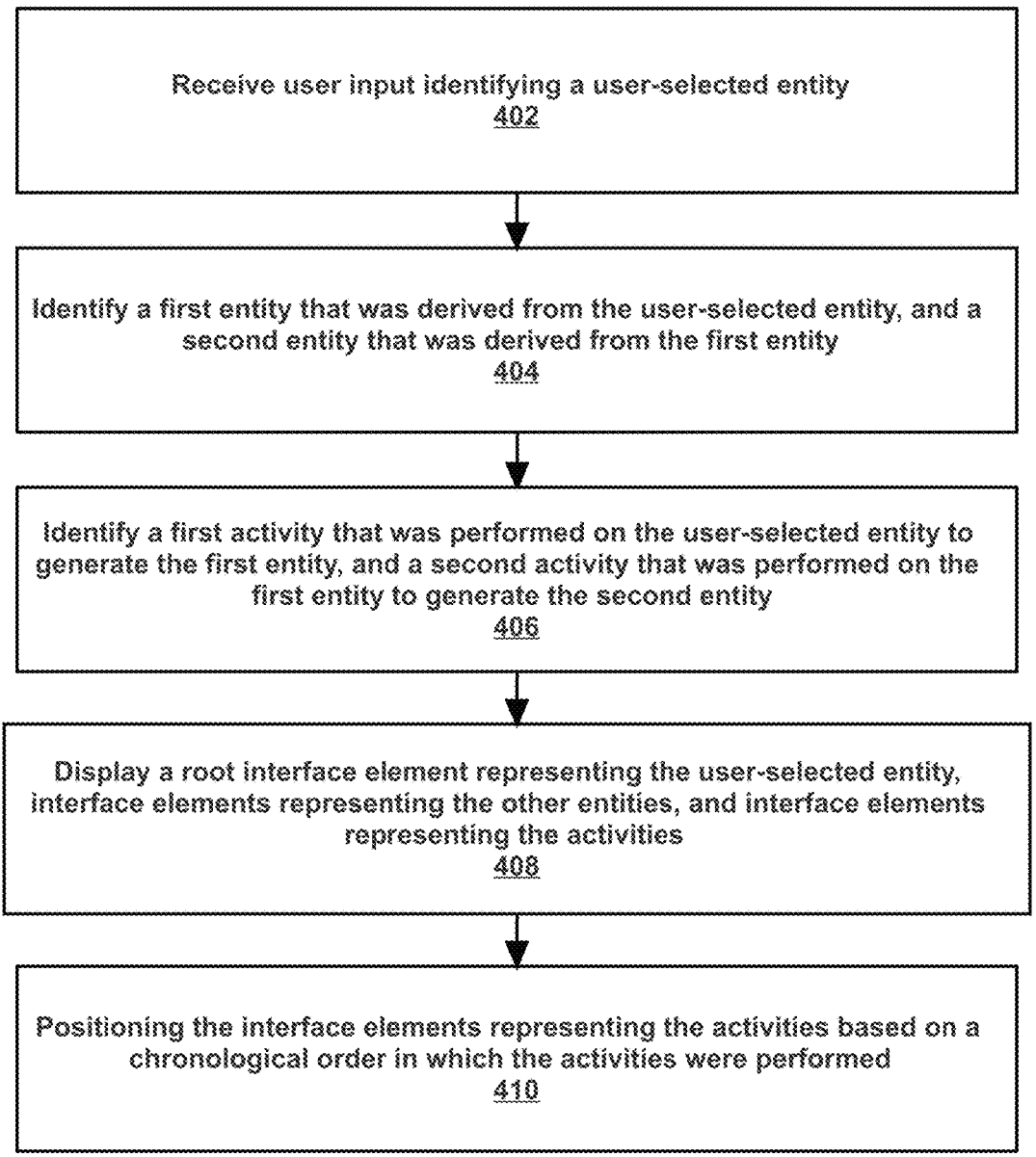
FIG. 4 illustrates an example set of operations for displaying a visualization representing activities based on a chronological order in which the activities were performed, in accordance with one or more embodiments.

4. Displaying a Visualization Representing Activities Based on a Chronological Order in which the Activities were Performed FIG. 4 illustrates an example set of operations for displaying a visualization representing activities based on a chronological order in which the activities were performed, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include receiving user input identifying a user-selected entity (Operation 402). User input, received through an interface, identifies the user-selected entity as a particular entity for which provenance data is to be displayed. Descriptions and examples of receiving user input identifying the user-selected entity are described above with reference to Operation 202 of FIG. 2.

One or more embodiments include identifying a first entity that was derived from the user-selected entity, and a second entity that was derived from the first entity (Operation 404). Entities that were derived, directly or indirectly, from a particular entity may be identified based on monitoring data. Generating, storing, and using monitoring data is described above with reference to Operation 208.

One or more embodiments include identifying a first activity that was performed on the user-selected entity to generate the first entity, and a second activity that was performed on the first entity to generate the second entity (Operation 406). As described above, activities performed in a target computer system or application are monitored. Generating, storing, and using monitoring data is described above with reference to Operation 208.

Based on the monitoring data, activities performed on a particular entity to generate another entity are determined. An activity type and/or attributes of an activity, such as a start time and an end time of an activity, are also determined. In some embodiments, based on the monitoring data, agents that performed the activities on a particular entity to generate another entity are also determined.

As an example, an electronic file system may include a document D1. On January 1, at 10:00 AM, a user U1 may begin to make a copy of document D1 to generate a new document D2. On January 1, at 10:05 AM, the copying may be completed, and document D2 may be generated. The electronic file system may maintain a log of the entities, activities, and agents associated with the electronic file system. Document D1 may be recorded as entity E1 in the log. Document D2 may be recorded as entity E2 in the log. A log entry may indicate that entity E2, corresponding to document D2, was copied from entity E1. The log entry may further indicate that the copying activity was performed by user U1, starting at January 1, at 10:00 AM, and ending at January 1, at 10:05 AM. Based on the information in the log, entity E2 may be determined to be derived from entity E1. The activity performed on E1 to generate E2 may be identified as "Copying." The agent that performed the activity may be determined to be user U1. The start time and end time of the activity may be determined to be January 1 at 10:00 AM and January 1 at 10:05 AM, respectively.

One or more embodiments include displaying a root interface element representing the user-selected entity, interface elements representing the other entities, and interface elements representing the activities (Operation 408). An interface displays the interface elements. The interface elements may be displayed with one or more visualizations and/or annotations. In some embodiments, interface elements representing agents that performed the first activity and/or the second activity are also displayed.

User input, received through an interface, may include a selection of a particular display mode for displaying the provenance data associated with the user-selected entity. Two or more display modes may be available for selection, as described below.

Based on the monitoring data, activities that were performed on an entity and/or that generated another entity are identified. The activities are verified against one or more constraints. An activity having an attribute that does not match a constraint is identified as an activity with a potential problem. If a first display mode is selected by the user, activities with potential problems are not displayed. If a second display mode is selected by the user, activities with potential problems are displayed. Activities with potential problems are displayed with visualizations indicating that attributes of the activities do not match one or more constraints. The second display mode may also be referred to as an "analysis mode," "audit mode," and/or "debug mode." A user viewing provenance data in the analysis mode may identify potential problems and attempt to address the potential problems.

A first example of a constraint is that an activity cannot be performed on a non-existent entity. An inquiry is made as to whether a particular entity was created prior to the performance of an activity on the particular entity. As an example, a "Modifying" activity may be identified as having been performed on a particular entity E1 at 10 AM. An inquiry is made as to whether a "Creation" activity for entity E1 was performed prior to 10 AM. If no "creation" activity for entity E1 was performed prior to 10 AM, then the constraint is not satisfied.

A second example of a constraint is that an activity cannot be performed on an invalidated entity. An inquiry is made as to whether a particular entity was invalidated (such as deleted) prior to the performance of an activity on the particular entity. If the particular entity was invalidated prior to the performance of an activity on the particular entity, then the constraint is not satisfied.

A third example of a constraint is that an activity cannot generate an entity after another activity was already performed on the entity. An inquiry is made as to whether a first activity that generated a particular entity occurs after a second activity that was performed on the particular entity. If the first activity occurs after the second activity, then the constraint is not satisfied.

A fourth example of a constraint is that a particular activity cannot start after the particular activity ends. An inquiry is made as to whether a start time of a particular activity is after an end time of the particular activity. If the start time is after the end time, then the constraint is not satisfied. Additionally, if either a start time or an end time of a particular activity is missing from the information monitored from a target computer system or application, then the start time and the end time are considered to be the same.

A fifth example of a constraint is that if two or more same activities, performed by a same agent, on a same entity are identified, then only one of the activities are considered to have been performed. The remaining activities do not satisfy the constraint.

Additional constraints may be provided by a particular target computer system or application. As an example, a target application may disallow a junior-level user from deleting an entity prior to obtaining an approval for the deletion from a senior-level user. A constraint would be that a deletion activity by a junior-level user cannot occur unless an approval activity precedes the deletion activity. An inquiry would be made as to whether an approval activity precedes a deletion activity.

One or more embodiments include positioning the interface elements representing the activities based on a chronological order in which the activities were performed (Operation 410). A monitoring engine and/or a visualization engine identifies a start time and/or end time of the activities. The start time and/or end time of the first activity is compared against the start time and/or end time of the second activity. As an example, the start time of the first activity is compared to the start time of the second activity. As another example, the end time of the first activity is compared to the end time of the second activity. If the start time and/or end time of the first activity is before the start time and/or end time of the second activity, then the first activity is considered to be performed before the second activity. A chronological order of the activities would be: the first activity, and then the second activity.

The positioning of the interface elements representing the activities, as displayed at an interface, may represent the chronological order of the activities. As an example, an upper portion of an interface may represent an earlier time period, while a lower portion of the interface may represent a later time period. A first activity may be performed before a second activity. Based on the chronological order of the activities, an interface element representing the first activity would be positioned above an interface element representing the second activity.

As another example, a left portion of an interface may represent an earlier time period, while a right portion of the interface may represent a later time period. A first activity may be performed before a second activity. Based on the chronological order of the activities, an interface element representing the first activity would be positioned to the left of an interface element representing the second activity.

As another example, a timeline may be rendered at an interface. A first end of the timeline may represent an earlier time period, and a second end of the timeline may represent a later time period. The timeline may be displayed as an arrow that points from the first end to the second end. A first activity may be performed before a second activity. Based on the chronological order of the activities, an interface element representing the first activity would be positioned closer to the first end of the timeline, while an interface element representing the second activity would be positioned closer to the second end of the timeline.

An interface element representing an activity may be annotated with a start time and/or end time of the activity. An interface element representing the first activity is annotated with a start time and/or end time of the first activity. An interface element representing the second activity is annotated with a start time and/or end time of the second activity. The annotations associated with the interface elements are positioned based on a chronological order in which the first activity and the second activity were performed.

Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 5A:
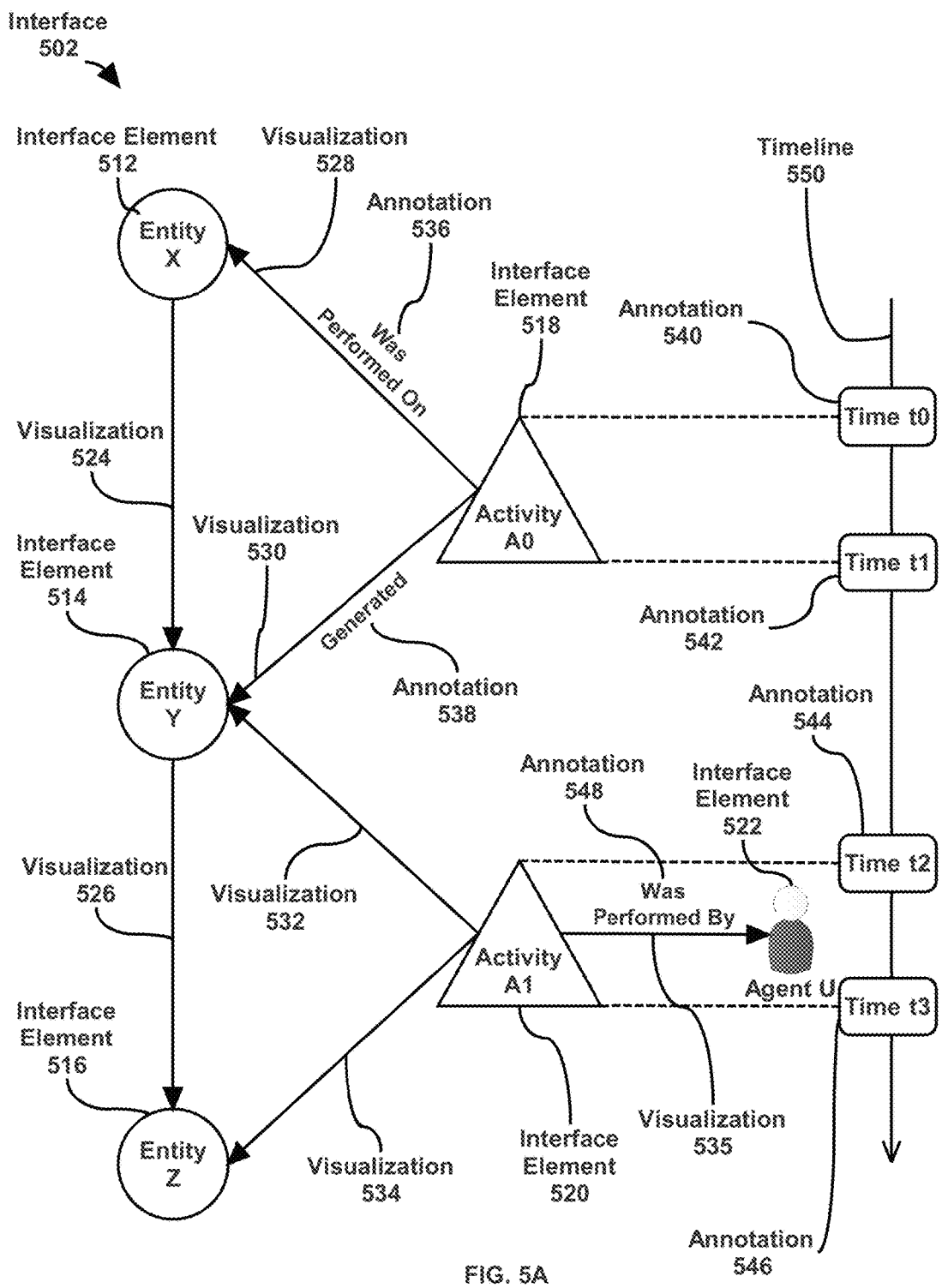
FIG. 5A illustrates an example of an interface displaying a visualization representing activities on a timeline, in accordance with one or more embodiments.

FIG. 5A illustrates an example of an interface displaying a visualization representing activities on a timeline, in accordance with one or more embodiments. As an example, an interface receives a request for entities that were used to derive entity Z. Entity Y is determined to be used to derive entity Z, and entity X is determined to be used to derive entity Y. Activity A0 is determined to be performed on entity X to generate entity Y. Activity A1 is determined to be performed on entity Y to generate entity Z. Activity A1 is determined to be performed by agent U.

Interface 502 is rendered. As illustrated, interface 502 displays interface elements 512-522, visualizations 524-535, annotations 536-548, and timeline 550. Interface element 512 represents entity X. Interface element 514 represents entity Y. Interface element 516 represents entity Z. Interface element 518 represents activity A0. Interface element 520 represents activity A1. Interface element 522 represents agent U.

Visualization 524, associated with interface elements 512-514, represents a relationship between entity X and entity Y. Visualization 526, associated with interface elements 514-516, represents a relationship between entity Y and entity Z. Visualization 528, associated with interface element 512 and interface element 518, represents that activity A0 was performed on entity X. Visualization 530, associated with interface element 514 and interface element 518, represents that activity A0 generated entity Y. Visualization 532, associated with interface element 514 and interface element 520, represents that activity A1 was performed on entity Y. Visualization 534, associated with interface element 516 and interface element 520, represents that activity A1 generated entity Z.

Optionally, agents that performed a particular activity may be displayed. As illustrated, interface element 522 representing agent U is displayed. Visualization 535, associated with interface element 520 and interface element 522, represents that activity A1 was performed by agent U.

Optionally, any of interface elements 512-522 may be associated with one or more annotations and/or visualizations. Any of visualizations 524-535 may be associated with one or more annotations. As illustrated, annotation 536, associated with visualization 528, includes the text "Was Performed On" to indicate that activity A0 was performed on entity X. Annotation 538, associated with visualization 530, includes the text "Generated" to indicate that activity A0 generated entity Y. Annotation 548, associated with visualization 535, includes the text "Was Performed By" to indicate that activity A1 was performed by agent U. Additionally or alternatively, annotations (not shown) may be associated with visualization 524 and visualization 526. Visualization 524 may be labeled with the text "Was Used to Derive." Visualization 526 may be labeled with the text "Was Used to Derive."

A start time of activity A0 is determined to be time t0. An end time of activity A0 is determined to be time t1. A start time of activity A1 is determined to be time t2. An end time of activity A1 is determined to be time t3. Time t0 is before time t2. Time t1 is before time t3. Based on these comparisons, activity A0 is determined to be performed before activity A1.

Timeline 550 is rendered as an arrow at interface 502. The end of the arrow with the pointer represents a later time period, while the other end of the arrow represents an earlier time period. The arrow points from an upper portion of interface 502 to a lower portion of interface 502.

Interface element 518 (representing activity A0) and interface element 520 (representing activity A1) are positioned based on a chronological order in which activity A0 and activity A1 were performed. Based on timeline 550, an upper portion of interface 502 represents an earlier time period, and a lower portion of interface 502 represents a later time period. Since activity A0 was performed before activity A1, interface element 518 is positioned above interface element 520.

Annotation 540, associated with interface element 518, indicates start time t0 of activity A0. Annotation 542, associated with interface element 518, indicates end time t1 of activity A0. Annotation 544, associated with interface element 520, indicates start time t2 of activity A1. Annotation 546, associated with interface element 520, indicates end time t3 of activity A1.

Annotations 540-546 are positioned based on a chronological order in which activity A0 and activity A1 were performed. Annotation 540 is positioned on an upper portion of timeline 550. Annotation 542 is positioned below annotation 540 on timeline 550. Annotation 544 is positioned below annotation 542 on timeline 550. Annotation 546 is positioned below annotation 544 on timeline 550.

Figure 5B:
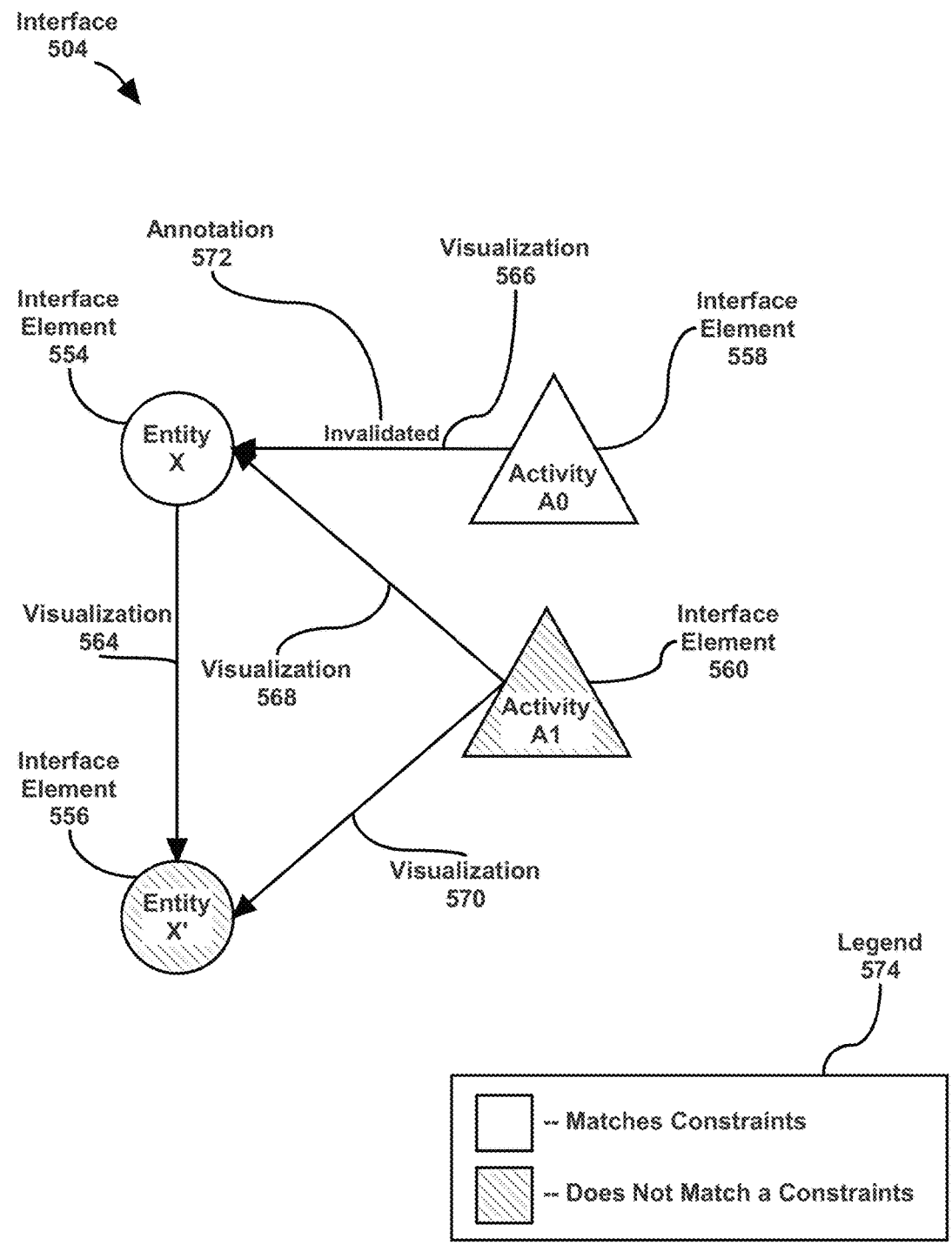
FIG. 5B illustrates an example of an interface displaying a visualization representing activities in an analysis mode, in accordance with one or more embodiments.

FIG. 5B illustrates an example of an interface displaying a visualization representing activities in an analysis mode, in accordance with one or more embodiments. As an example, an interface receives a request for entities that were used to derive entity X'. Entity X is determined to be used to derive entity X'.

A constraint is that an activity cannot be performed on a particular entity after the particular entity has been invalidated. Activity A0 is determined to be performed on entity X to invalidate entity X. Activity A1 is determined to be performed on entity X to generate entity X'.

An inquiry is made as to whether activity A1 is performed after activity A0. A start time and/or end time of activity A0 and activity A1 are determined. Based on the start time and/or end times, activity A0 is determined to be performed before activity A1. Since activity A0 is performed before activity A1, the constraint is not satisfied. Activity A1 is determined to have a potential problem.

An analysis display mode is selected by a user. In the analysis display mode, activities without potential problems and activities with potential problems are displayed. Interface 504 is rendered. Legend 574 indicates that activities that match constraints are displayed using a first visualization (such as, in the color white), while activities that do not match one or more constraints are displayed using a second visualization (such as, in the color gray).

As illustrated, interface element 554 represents Entity X. Interface element 556 represents Entity X'. Visualization 564, associated with interface elements 554-556, represents a relationship between entity X and entity X'.

Interface element 558 represents activity A0. Visualization 566, associated with interface element 554 and interface element 558, represents that activity A0 invalidated entity X. Annotation 572, associated with visualization 566, includes the text "Invalidated," to indicate that activity A0 invalidated entity X.

Interface element 560 represents activity A1. Visualization 568, associated with interface element 554 and interface element 560, represents that activity A1 was performed on entity X. Visualization 570, associated with interface element 556 and interface element 560, represents that activity A1 generated entity X'.

Attributes of activity A0 matches all constraints. Interface element 558 (representing activity A0) is displayed in the color white. According to legend 574, the color white indicates that activity A0 matches all constraints.

Since the start time and/or end time of activity A1 does not match a constraint, interface element 560 (representing activity A1) is displayed in the color gray. In addition, since entity X' was generated by activity A1, entity X' also does not match the constraint. Interface element 556 (representing entity X') is also displayed in the color gray. According to legend 574, the color gray indicates that activity A1 and entity X' do not match one or more constraints.

Figure 6:
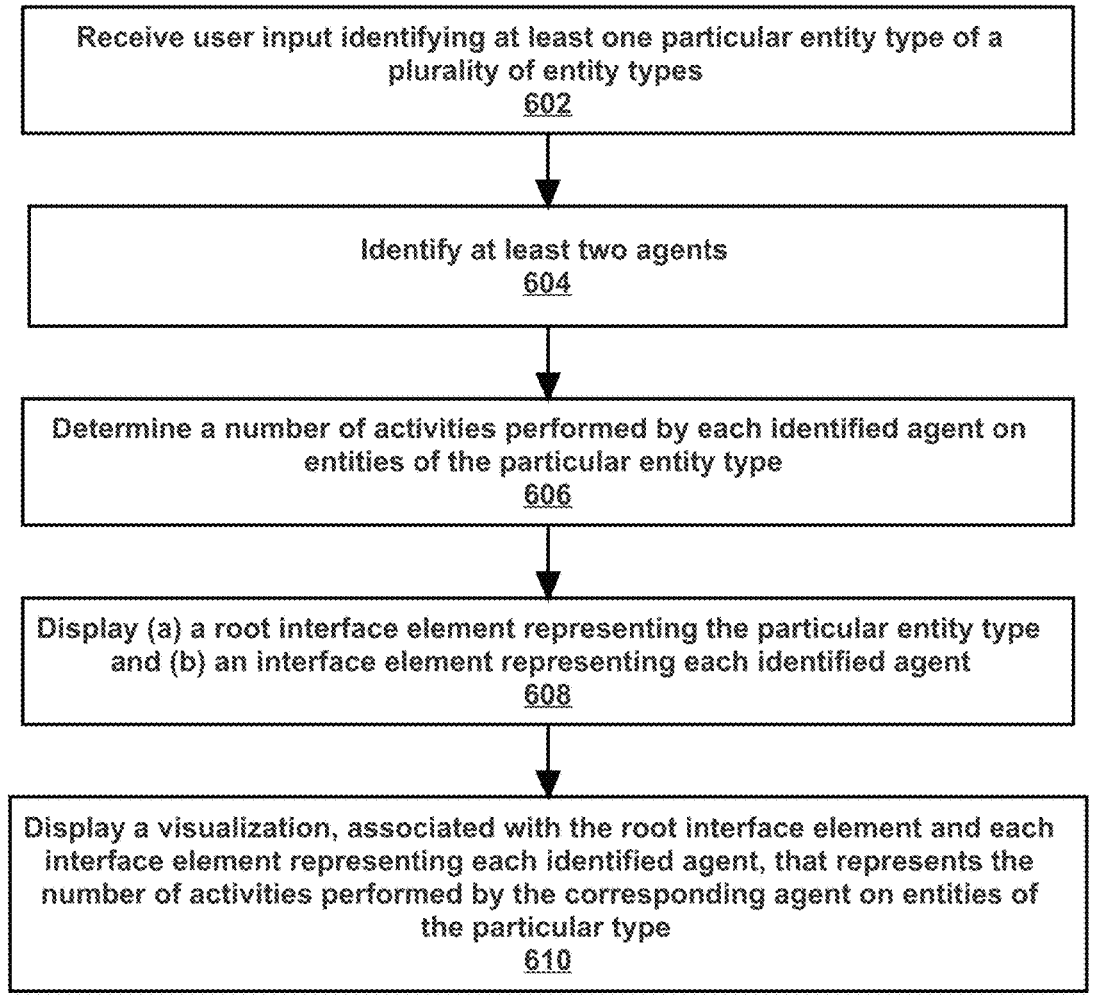
FIG. 6 illustrates an example set of operations for displaying a visualization representing a number of activities performed, by particular agents, on entities of a particular entity type, in accordance with one or more embodiments.

5. Displaying a Visualization Representing a Number of Activities Performed, by Particular Agents, on Entities of a Particular Entity Type FIG. 6 illustrates an example set of operations for displaying a visualization representing a number of activities performed, by particular agents, on entities of a particular entity type, in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

One or more embodiments include receiving user input identifying at least one particular entity type of a plurality of entity types (Operation 602). User input, entered by a user through an interface, identifies the particular entity type.

User input received in a blank field (such as a textbox), presented at an interface, may include an identification of the particular entity type. The user input may include a unique identifier, label, and/or name of the particular entity type.

User input may include a selection of the particular entity type from a list of entity types presented at an interface. The list of entity types is determined based on monitoring of entities, activities, and/or agents of a target computer system or application. Generating, storing, and using monitoring data is described above with reference to Operation 208.

An entity type of each entity in a target computer system or application may be included in the monitoring data. An entity type of an entity may be determined using metadata associated with the entity. Alternatively or additionally, an entity type of an entity may be determined by processing and/or analyzing the entity itself. As an example, an electronic file system may store various documents. A first entity type may include documents about "Dogs." A second entity type may include documents about "Cats." Natural language processing may be performed on the content of each document to determine a topic of the document. Based on the topic, each document is classified into the first entity type or the second entity type.

One or more embodiments include identifying at least two agents, a first agent and a second agent (Operation 604). User input, received through an interface, may identify the agents. The user input may include a unique identifier or name of the agents, or a selection of the agents from a plurality of agents presented at the interface.

Additionally or alternatively, the agents are identified based on a set of one or more rules. As an example, a rule may be to identify all agents that are associated with a target computer system or application. As another example, a rule may be to identify all agents that performed an activity during a particular time period. As another example, a rule may be to identify all agents matching certain attributes, such as all agents who are persons, or all agents that are software applications and/or operations.

One or more embodiments include determining a number of activities performed by each identified agent on entities of the particular entity type (Operation 606). Activities performed in a target computer system or application are monitored. Generating, storing, and using monitoring data is described above with reference to Operation 208. For each activity that is monitored, the monitoring data may include an activity type of the corresponding activity, attributes of the corresponding activity, entities associated with the corresponding activity, and attributes of the entities associated with the corresponding activity.

For each identified agent, a search may be performed to identify entries and/or records in the monitoring data that match the following criteria: (a) the associated entity is of the particular entity type, and (b) the identified agent performed the corresponding activity. The search traverses through the following fields in the monitoring data: (a) the entity type of the entity upon which the activity was performed, and (b) the agent that performed the activity. The number of entries in the monitoring data that match the criteria is determined as the number of activities performed by the identified agent on entities of the particular type.

Based on a search of the monitoring data, activities that are (a) performed by the first agent and (b) performed on an entity of the particular entity type may be identified. The number of identified activities is determined as the number of activities performed by the first agent on entities of the particular entity type. Further, activities that are (a) performed by the second agent and (b) performed on an entity of the particular entity type are identified. The number of identified activities is determined as the number of activities performed by the second agent on entities of the particular entity type.

A number of activities performed by each identified agent on entities of the particular entity type may be determined for a particular time period. The particular time period may be specified by a user via user input. Alternatively, the particular time period may be determined based on one or more rules. A rule may be that the particular time period is, for example, the most recent 30 day period, or the previous month.

Based on the particular time period, an additional criterion may be added to the search over the monitoring data. The search identifies entries in the monitoring data that match the following criteria: (a) the associated entity is of the particular entity type, (b) the identified agent performed the corresponding activity, and (c) the corresponding activity was performed during the particular time period. The number of entries in the monitoring data that match the criteria is determined as the number of activities performed by the identified agent on entities of the particular type during the particular time period.

One or more embodiments include displaying (a) a root interface element representing the particular entity type, and (b) an interface element representing each identified agent (Operation 608). A root interface element represents the particular entity type. A first interface element represents the first agent. A second interface element represents the second agent. Additional interface elements may represent additional entity types and/or additional agents. The interface elements are rendered at an interface.

One or more embodiments include displaying a visualization, associated with the root interface element and each interface element representing each identified agent, that represents the number of activities performed by the corresponding agent on entities of the particular type (Operation 610). A first visualization is associated with the root interface element and a first interface element representing the first agent. The first visualization represents the number of activities performed by the first agent on entities of the particular entity type. A second visualization is associated with the root interface element and a second interface element representing the second agent. The second visualization represents the number of activities performed by the second agent on entities of the particular entity type.

Each visualization may be a line connecting the root interface element and each identified agent. The width of the line represents a number of activities performed by the corresponding agent on entities of the particular type. A thicker line represents a larger number of activities, while a narrower line represents a smaller number of activities. A first visualization is a line connecting the root interface element and a first interface element representing the first agent. The width of the line represents a number of activities performed by the first agent on entities of the particular type. A second visualization is a line connecting the root interface element and a second interface element representing the second agent. The width of the line represents a number of activities performed by the second agent on entities of the particular type.

In one or more embodiments (not shown), user input may include a request to view a visualization representing numbers of activities corresponding to alternative or additional categories. A category is defined by characteristics such as entity types, attributes of entities, activity types, attributes of activities, and/or agents. FIG. 6, as described above, illustrates an example set of operations for displaying a visualization representing numbers of activities in categories that are defined by (a) entity types and (b) agents. A first category includes activities that are (a) performed by a first agent and (b) performed on entities of a particular entity type. A second category includes activities that are (a) performed by a second agent and (b) performed on entities of the particular entity type.

In another embodiment, categories are defined by (a) entity types and (b) activity types. A first category includes activities that are (a) of a first activity type and (b) performed on entities of a particular entity type. A second category includes activities that are (a) of a second activity type and (b) performed on entities of the particular entity type. In this scenario, the categories are not defined by the agents, and thus identification of one or more agents is not necessary. The number of activities in each of the first category and the second category is determined. A root interface element representing the particular entity type, a first interface element representing the first activity type, and a second interface element representing the second activity type are displayed. A first visualization, associated with the root interface element and the first interface element, is displayed. The first visualization represents the number of activities in the first category, which is the number of activities that are (a) of the first activity type and (b) performed on entities of the particular entity type. A second visualization, associated with the root interface element and the second interface element, is displayed. The second visualization represents the number of activities in the second category, which is the number of activities that are (a) of the second activity type and (b) performed on entities of the particular entity type.

In another embodiment, categories are defined by (a) entity types and (b) attributes of entities. A first category includes activities that are (a) performed on entities of a particular entity type and (b) modifying a first attribute of the entities. A second category includes activities that are (a) performed on entities of the particular entity type and (b) modifying a second attribute of the entities. In this scenario, the categories are not defined by the agents, and thus identification of one or more agents is not necessary. The number of activities in each of the first category and the second category is determined. A root interface element representing the particular entity type, a first interface element representing the first attribute, and a second interface element representing the second attribute are displayed. A first visualization, associated with the root interface element and the first interface element, is displayed. The first visualization represents the number of activities in the first category, which is the number of activities that are (a) performed on entities of the particular entity type and (b) modifying a first attribute of the entities. A second visualization, associated with the root interface element and the second interface element, is displayed. The second visualization represents the number of activities in the second category, which is the number of activities that are (a) performed on entities of the particular entity type and (b) modifying a second attribute of the entities.

Example Embodiment

Figure 7:
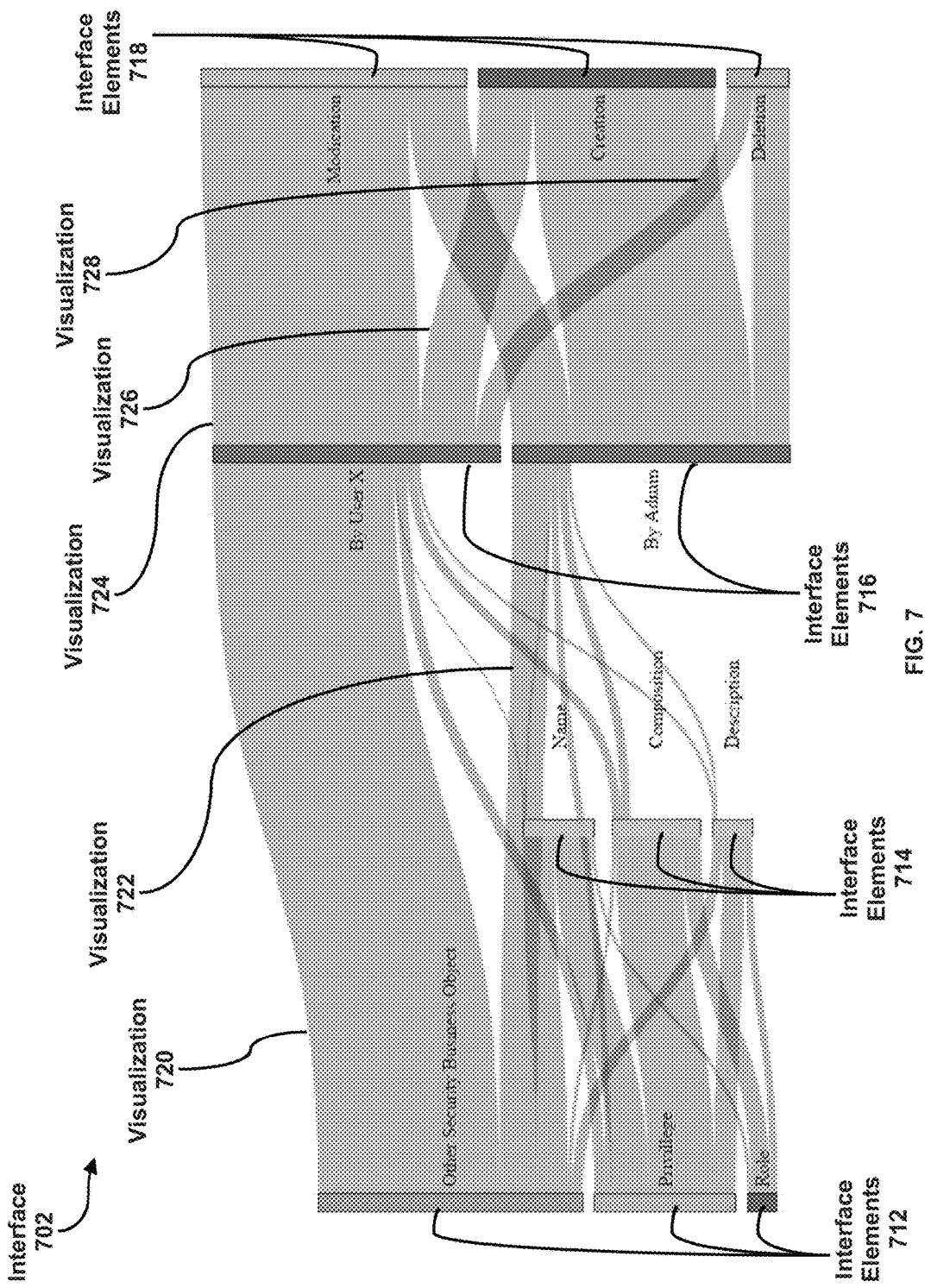
FIG. 7 illustrates an example of an interface displaying a visualization representing a number of activities performed, by particular agents, on entities of a particular entity type, in accordance with one or more embodiments.

A detailed example is described below for purposes of clarity. Components and/or operations described below should be understood as one specific example which may not be applicable to certain embodiments. Accordingly, components and/or operations described below should not be construed as limiting the scope of any of the claims. FIG. 7 illustrates an example of an interface displaying a visualization representing a number of activities performed, by particular agents, on entities of a particular entity type, in accordance with one or more embodiments.

As an example, an interface receives a request for a visualization representing numbers of activities in categories defined by entity types, agents, attributes of entities, and/or activity types. User input includes a selection of the following entity types: "Role," "Privilege," and "Other Security Business Object." User input includes a selection of the following agents: "User X" and "Admin." User input includes a selection of the following attributes of entities: "Name," "Composition," and "Description." User input includes a selection of the following activity types: "Modification," "Creation," and "Deletion."

Based on the user selections, at least the following categories are determined:
(A) A first category for activities that are (a) performed by User X and (b) performed on entities of the type entity "Other Security Business Object";
(B) A second category for activities that are (a) performed by Admin and (b) performed on entities of the entity type "Other Security Business Object";
(C) A third category for activities that are (a) of the activity type "Modification" and (b) performed by User X;
(D) A fourth category for activities that are (a) of the activity type "Creation" and (b) performed by User X;
(D) A fifth category for activities that are (a) of the activity type "Deletion" and (b) performed by User X.

Activities in a target application are monitored and stored in a log. A query is performed on the log to identify activities in the first category. A first criterion for the query is that the activity is performed by User X. A second criterion is that the activity is performed on entities of the entity type "Other Security Business Object." A third criterion is that the activity corresponds to an activity type of "Modification," "Creation," and/or "Deletion." A number of activities matching the first criterion, the second criterion, and the third criterion are determined. This number is the number of activities in the first category. The number of activities in the first category is, for example, 653.

The first criterion and the second criterion are included in the query since the agent and the entity type define the first category. The third criterion is included in the query due to the scope of the user's request. Based on the user's selection, the user is interested in activities of the activity types, "Modification," "Creation," and "Deletion," and not other activity types. Activities not corresponding to one of the activity types of interest are not represented in the visualization.

Similarly, a query is performed on the log to identify activities in the second category. A first criterion for the query is that the activity is performed by Admin. A second criterion is that the activity is performed on entities of the entity type "Other Security Business Object." A third criterion is that the activity corresponds to an activity type of "Modification," "Creation," and/or "Deletion." A number of activities matching the first criterion, the second criterion, and the third criterion are determined. This number is the number of activities in the second category. The number of activities in the second category is, for example, 319.

Similarly, a query is performed on the log to identify activities in the third category. A first criterion for the query is that the activity is of the activity type "Modification." A second criterion is that the activity is performed by User X.

A third criterion is that the activity was performed on an entity corresponding to an entity type of "Role," "Privilege," and/or "Other Security Business Object." A number of activities matching the first criterion, the second criterion, and the third criterion are determined. This number is the number of activities in the third category. The number of activities in the third category is, for example, 586.

Similarly, a query is performed on the log to identify activities in the fourth category. A first criterion for the query is that the activity is of the activity type "Creation." A second criterion is that the activity is performed by User X. A third criterion is that the activity was performed on an entity corresponding to an entity type of "Role," "Privilege," and/or "Other Security Business Object." A number of activities matching the first criterion, the second criterion, and the third criterion are determined. This number is the number of activities in the fourth category. The number of activities in the fourth category is, for example, 250.

Similarly, a query is performed on the log to identify activities in the fifth category. A first criterion for the query is that the activity is of the activity type "Deletion." A second criterion is that the activity is performed by User X. A third criterion is that the activity was performed on an entity corresponding to an entity type of "Role," "Privilege," and/or "Other Security Business Object." A number of activities matching the first criterion, the second criterion, and the third criterion are determined. This number is the number of activities in the fifth category. The number of activities in the fifth category is, for example, 111.

Interface 702 is rendered. As illustrated, interface elements 712 represent entity types, "Role," "Privilege," and "Other Security Business Object," respectively. Interface elements 714 represent attributes of entities, "Name," "Composition," and "Description," respectively. Interface elements 716 represent agents, "User X" and "Admin," respectively. Interface elements 718 represent activity types, "Modification," "Creation," and "Deletion," respectively.

Visualization 720 is a line between the interface element representing "Other Security Business Object" and the interface element representing "User X." Visualization 720 represents the number of activities in the first category, which is 653. Activities in the first category are activities that are (a) performed by User X and (b) performed on entities of the type entity "Other Security Business Object."

Visualization 722 is a line between the interface element representing "Other Security Business Object" and the interface element representing "Admin." Visualization 722 represents the number of activities in the second category, which is 319. Activities in the second category are activities that are (a) performed by Admin and (b) performed on entities of the type entity "Other Security Business Object."

The widths of visualization 720 and visualization 722 represent the numbers of activities in the first category and the second category, respectively. Since the number of activities in the first category is greater than the number of activities in the second category, the width of visualization 720 is thicker than the width of visualization 722.

The percentage of activities performed on "Other Security Business Object" by User X is, for example, 67%. The percentage of activities performed on "Other Security Business Object" by Admin is, for example, 33%. Based on the percentages, the width of visualization 720 is 67% of the width of the interface element representing "Other Security Business Object." The width of visualization 722 is 33% of the width of the interface element representing "Other Security Business Object."

Visualization 724 is a line between the interface element representing "User X" and the interface element representing "Modification." Visualization 724 represents the number of activities in the third category, which is 586. Activities in the third category are activities that are (a) of the activity type "Modification" and (b) performed by User X.

Visualization 726 is a line between the interface element representing "User X" and the interface element representing "Creation." Visualization 726 represents the number of activities in the fourth category, which is 250. Activities in the fourth category are activities that are (a) of the activity type "Creation" and (b) performed by User X.

Visualization 728 is a line between the interface element representing "User X" and the interface element representing "Deletion." Visualization 728 represents the number of activities in the fifth category, which is 111. Activities in the fifth category are activities that are (a) of the activity type "Deletion" and (b) performed by User X.

The widths of visualization 724, visualization 726, and visualization 728 represent the numbers of activities in the third category, the fourth category, and the fifth category, respectively. Since the number of activities in the third category is greater than the number of activities in the fourth category, the width of visualization 724 is thicker than the width of visualization 726. Since the number of activities in the fourth category is greater than the number of activities in the fifth category, the width of visualization 726 is thicker than the width of visualization 728.

The percentage of activities performed by User X that are of activity type "Modification," is, for example, 62%. The percentage of activities performed by User X that are of activity type "Creation" is, for example, 26%. The percentage of activities performed by User X that are of activity type "Deletion" is, for example, 12%. Based on the percentages, the width of visualization 724 is 62% of the width of the interface element representing User X. The width of visualization 726 is 26% of the width of the interface element representing User X. The width of visualization 728 is 12% of the width of the interface element representing User X.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
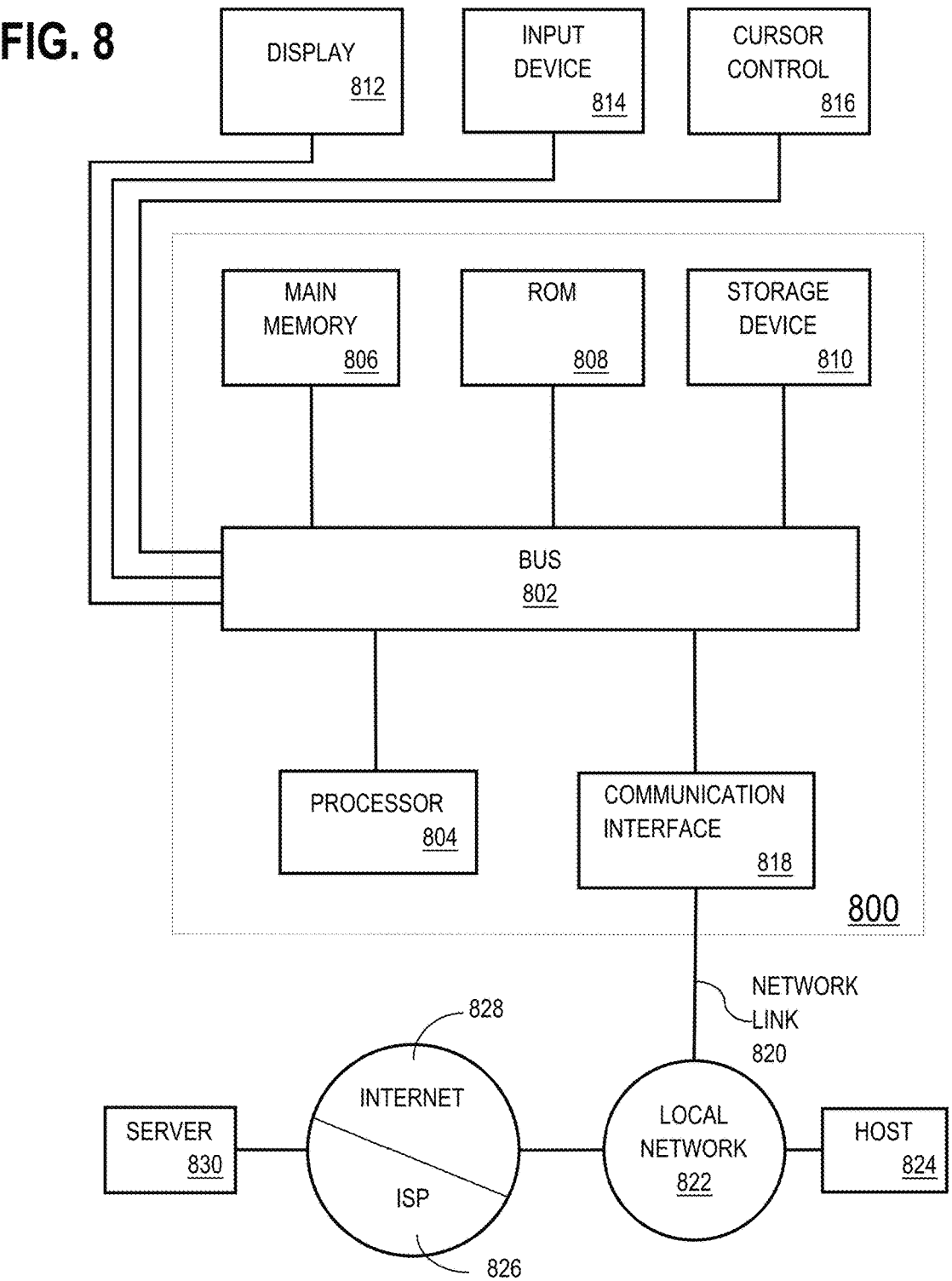
FIG. 8 shows a block diagram that illustrates a computer system, in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    receiving a request to display a requested set of entities, comprising:
        a first set of entities that were derived from a first entity;
    based on the request, identifying the first set of entities;
    determining a first activity was performed on the first entity to derive a second entity of the first set of entities;
    determining a second activity was performed on the second entity to derive a third entity;
    determining a chronological order in which the first activity and the second activity were performed;
    based on the chronological order in which the first activity and the second activity were performed, selecting a first position for displaying a first activity interface element representing the first activity and a second position for displaying a second activity interface element representing the second activity;
    concurrently displaying (a) a first interface element representing the first entity, (b) a second interface element representing the second entity, (c) a first visualization, associated with the first interface element and the second interface element, that represents a first relationship between the first entity and the second entity, (d) the first activity interface element at the first position, and (e) the second activity interface element at the second position.

2. The medium of claim 1, wherein the second entity was derived from the first entity, and wherein the first visualization is associated with an annotation indicating that the second entity was derived from the first entity.

3. The medium of claim 1, wherein the requested set of entities further comprises a second set of entities that were used to derive the first entity, and the concurrently displaying operation further comprises concurrently displaying (f) a third interface element representing a fourth entity of the second set of entities, and (g) a second visualization, associated with the first interface element and the third interface element, that represents a second relationship between the first entity and the fourth entity.

4. The medium of claim 3, wherein the second visualization is associated with an annotation indicating that the fourth entity was used to derive the first entity.

5. The medium of claim 3, wherein:
    the concurrently displaying operation further comprises concurrently displaying (h) a third activity interface element representing a third activity that was performed on the fourth entity to derive the first entity.

6. The medium of claim 1, wherein the operations further comprise:
    determining that an attribute of the first activity does not match a constraint;
        displaying a fourth interface element representing the activity and a second visualization, associated with the first activity interface element, indicating that the first activity does not match the constraint.

7. The medium of claim 1, wherein the operations further comprise:
    determining that the first entity corresponds to at least a first entity type of a plurality of entity types and a second entity type of the plurality of entity types; and
    wherein displaying the first interface element representing the first entity comprises:
        displaying a second visualization corresponding to the first interface element and indicating that the first entity corresponds to at least the first entity type and the second entity type.

8. The medium of claim 1,
    wherein the requested set of entities further comprises a second set of entities that were used to derive the first entity;
    wherein the concurrently displaying operation further comprises: concurrently displaying (f) a third interface element representing the third entity, (g) a second visualization, associated with the second interface element and the third interface element, that represents a second relationship between the second entity and the third entity, (h) a fourth interface element representing a fourth entity of the second set of entities, (i) a third visualization, associated with the first interface element and the fourth interface element, that represents a third relationship between the first entity and the fourth entity, and (j) a third activity interface element representing a third activity that was performed on the fourth entity to derive the first entity
    wherein the first visualization is associated with a first annotation indicating that the second entity was derived from the first entity;
    wherein the second visualization is associated with a second annotation indicating that the third entity was derived from the second entity;
    wherein the third visualization is associated with a third annotation indicating that the first entity was derived from the fourth entity;
    wherein the operations further comprise:
        determining that an attribute of the first activity does not match a constraint;
        displaying a fourth visualization indicating that the first activity does not match the constraint;
        determining that the first entity corresponds to at least a first entity type of a plurality of entity types and a second entity type of the plurality of entity types;
        displaying a fifth visualization corresponding to the first interface element and indicating that the first entity corresponds to at least the first entity type and the second entity type.

9. The medium of claim 1, wherein:
the operations further comprises: displaying a timeline; and
the first position corresponds to an earlier position on the timeline and the second position corresponds to a later position on the timeline.

10. The medium of claim 1, wherein the operations further comprise:
determining a third activity was performed on the first entity to derive a fourth entity of the first set of entities;
determining that an attribute of the third activity does not match a constraint;
refraining from displaying any interface element, representing the third activity, concurrently with the first interface element.

11. The medium of claim 1, wherein the operations further comprise:
determining a third activity was performed on the first entity to derive a fourth entity of the first set of entities;
determining that an attribute of the third activity does not match a constraint;
determining a selected display mode;
based on the selected display mode, performing one of:
(a) refraining from displaying any interface element, representing the third activity, concurrently with the first interface element;
(b) displaying a third activity interface element representing the third activity and a second visualization, associated with the third activity interface element, indicating that the third activity does not match the constraint.

12. A system comprising:
at least one hardware device including a processor;
the system configured to perform operations comprising:
receiving a request to display a requested set of entities, comprising:
a first set of entities that were derived from a first entity;
based on the request, identifying the first set of entities;
determining a first activity was performed on the first entity to derive a second entity of the first set of entities;
determining a second activity was performed on the second entity to derive a third entity;
determining a chronological order in which the first activity and the second activity were performed;
based on the chronological order in which the first activity and the second activity were performed, selecting a first position for displaying a first activity interface element representing the first activity and a second position for displaying a second activity interface element representing the second activity;
concurrently displaying (a) a first interface element representing the first entity, (b) a second interface element representing the second entity, (c) a first visualization, associated with the first interface element and the second interface element, that represents a first relationship between the first entity and the second entity, (d) the first activity interface element at the first position, and (e) the second activity interface element at the second position.

13. The system of claim 12, wherein the second entity was derived from the first entity, and wherein the first visualization is associated with an annotation indicating that the second entity was derived from the first entity.

14. The system of claim 12, wherein the requested set of entities further comprises a second set of entities that were used to derive the first entity, and the concurrently displaying operation further comprises concurrently displaying (f) a third interface element representing a fourth entity of the second set of entities, and (g) a second visualization, associated with the first interface element and the third interface element, that represents a second relationship between the first entity and the fourth entity.

15. The system of claim 14,
and wherein the second visualization is associated with an annotation indicating that the fourth entity was used to derive the first entity.

16. A method, comprising:
receiving a request to display a requested set of entities, comprising: a first set of entities that were derived from a first entity;
based on the request, identifying the first set of entities;
determining a first activity was performed on the first entity to derive a second entity of the first set of entities;
determining a second activity was performed on the second entity to derive a third entity;
determining a chronological order in which the first activity and the second activity were performed;
based on the chronological order in which the first activity and the second activity were performed, selecting a first position for displaying a first activity interface element representing the first activity and a second position for displaying a second activity interface element representing the second activity;
concurrently displaying (a) a first interface element representing the first entity, (b) a second interface element representing the second entity, (c) a first visualization, associated with the first interface element and the second interface element, that represents a first relationship between the first entity and the second entity, (d) the first activity interface element at the first position, and (e) the second activity interface element at the second position.

* * * * *

UNITED STATES PATENT AND TRADEMARK OFFICE
CERTIFICATE OF CORRECTION

PATENT NO. : 10,235,781 B2
APPLICATION NO. : 14/997377
DATED : March 19, 2019
INVENTOR(S) : Beckett et al.

Page 1 of 1

It is certified that error appears in the above-identified patent and that said Letters Patent is hereby corrected as shown below:

In the Claims

In Column 26, Lines 14-15, in Claim 6, delete "a fourth interface element representing the activity and a" and insert -- a --, therefor.

In Column 26, Line 46, in Claim 8, delete "entity" and insert -- entity; --, therefor.

In Column 28, Line 22, in Claim 15, delete "and wherein" and insert -- wherein --, therefor.

Signed and Sealed this
Third Day of March, 2020

Andrei Iancu
*Director of the United States Patent and Trademark Office*